US009947001B2

United States Patent
Smith et al.

(10) Patent No.: US 9,947,001 B2
(45) Date of Patent: Apr. 17, 2018

(54) SYSTEM AND METHOD FOR USING MULTIPLE PAYMENT ACCOUNTS USING A SINGLE PAYMENT DEVICE

(71) Applicant: MasterCard International Incorporated, Purchase, NY (US)

(72) Inventors: Theresa Smith, St. Albans Hearts (GB); David Anthony Roberts, Appleton (GB); David John Sylvester, Brentwood (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1088 days.

(21) Appl. No.: 13/832,931

(22) Filed: Mar. 15, 2013

(65) Prior Publication Data

US 2014/0279559 A1    Sep. 18, 2014

(51) Int. Cl.
*G06Q 20/38*     (2012.01)
*G06Q 20/22*     (2012.01)
(Continued)

(52) U.S. Cl.
CPC ....... *G06Q 20/227* (2013.01); *G06Q 20/3227* (2013.01); *G06Q 20/3552* (2013.01); *G06Q 20/363* (2013.01); *G06Q 20/3829* (2013.01)

(58) Field of Classification Search
CPC ............ G06Q 20/382; G06Q 20/3821; G06Q 20/385; G06Q 20/352; G06Q 20/387; G06Q 20/363
(Continued)

(56) References Cited

U.S. PATENT DOCUMENTS 8,196,131 B1     6/2012  Von Behren et al.
8,646,059 B1 *   2/2014  von Behren et al. ............. 726/9
(Continued)

FOREIGN PATENT DOCUMENTS

EP     0138320 A2 *  8/1984  ........... G07F 19/206
EP     0138320 B1    3/1989
(Continued)

OTHER PUBLICATIONS

Notification of Transmittal of the International Search Report and Written Opinion of the International Searching Authority for International Searching Authority, or the Declaration (Form PCT/ISA/220)(Form PCT/ISA/210) (Form PCT/ISA/237) dated Jun. 16, 2014, in corresponding Application No. PCT/US2014/021107. (11 pages).
(Continued)

*Primary Examiner* — Hiep V Nguyen
(74) *Attorney, Agent, or Firm* — Buchanan Ingersoll & Rooney PC

(57) ABSTRACT

A method and system for transmitting multiple payment accounts for use by a payment device. The method includes allocating a cryptographic personal account number (CPAN) and producing at least one cryptographic master key set relating to this CPAN and transmitting, by a transmitting device, at least one produced cryptographic master key set for storage in a payment device. Further, the method includes receiving, by a receiving device, at least one device personal account number (DPAN), wherein each of the at least one DPAN is associated with a payment account associated with a consumer; generating, by a processing device, a repersonalization script for each of the at least one DPAN, wherein the repersonalization script includes a set of data associated with the corresponding DPAN; and transmitting, by the transmitting device, at least one repersonal-
(Continued)

ization script to the payment device. The payment device is configured to use the CPAN for selected cryptographic calculations, and use the DPAN and the associated set of data for other aspects of a financial transaction.

30 Claims, 5 Drawing Sheets

(51) Int. Cl.
G06Q 20/32 (2012.01)
G06Q 20/34 (2012.01)
G06Q 20/36 (2012.01)

(58) Field of Classification Search
USPC .......................................................... 705/71
See application file for complete search history.

(56) References Cited

U.S. PATENT DOCUMENTS

| 2007/0208671 | A1* | 9/2007 | Brown ................. G06Q 20/341 |
| | | | 705/65 |
| 2010/0169223 | A1 | 7/2010 | Yuan |
| 2012/0089519 | A1 | 4/2012 | Peddada |
| 2012/0172026 | A1 | 7/2012 | Kwon et al. |

FOREIGN PATENT DOCUMENTS

| KR | 20070083087 A | 8/2007 |
| KR | 10-2012-0010869 A | 2/2012 |
| KR | 101150241 B1 | 6/2012 |
| KR | 10-2012-0076594 A | 7/2012 |
| KR | 10-1256457 B1 | 4/2013 |
| WO | 2007149762 A2 | 12/2007 |
| WO | 2012-091349 A2 | 7/2012 |
| WO | 2012091349 A2 | 7/2012 |

OTHER PUBLICATIONS

Korean Office Action issued by the Korean Intellectual Property Office dated Oct. 6, 2016 in corresponding Korean patent application No. 10-2015-7029825, with English translation (56 pages).
de Ruiter, Joeri et al. "Formal Analysis of the EMV Protocol Suite," Digital Security Group, Institute for Computing and Information Science (ICIS) (17 pages).
Extended European Search Report issued by the European Patent Office dated Aug. 8, 2016 in corresponding European Patent Application No. 14768108.4 (13 pages).
Australian Examination Report issued by the Intellectual Property Office of Australia dated Jul. 8, 2016 in corresponding Australian Patent Application No. 2014237800 (3 pages).
Canadian Examination Report issued by the Canadian Intellectual Property Office dated Nov. 4, 2016 in corresponding Canadian patent application No. 2907096 (3 pages).
Japanese Office Action dated Nov. 18, 2016 by the Japanese Patent Office in corresponding Japanese patent application No. 2016-500722, with English language summary (3 pages).
Communication pursuant to Article 94(3) EPC dated Aug. 23, 2017, by the European Patent Office in corresponding European Patent Application No. 14 768 108.4-1958. (5 pages).

* cited by examiner

SYSTEM AND METHOD FOR USING MULTIPLE PAYMENT ACCOUNTS USING A SINGLE PAYMENT DEVICE

FIELD

The present disclosure relates to the use of multiple payment accounts for financial transactions via a single payment device, specifically the generating and transmitting of repersonalization scripts to a payment device for repersonalizing the device to utilize an associated payment account.

BACKGROUND

To conduct financial transactions, consumers traditionally have utilized physical-based payment methods, such as cash, checks, and credit cards. As technology has developed, computing devices such as televisions, desktop computers, notebook computers, cellular phones, smart phones, tablet computers, etc., have been developed as payment devices, to be used to initiate or conduct financial transactions. For example, many computers, smart phones, and televisions have been configured to conduct financial transactions over the Internet, by enabling a user to provide payment information that is then transmitted to the merchant.

In order to minimize the amount of payment information that users need to provide, and to increase payment account security, various types of secure storage, such as embedded secure elements, have been designed to be included in payment devices to store payment credentials. However, in many instances these secure elements are made inaccessible in order to maintain security. As a result, payment credentials may not be readily exchanged. This may, in turn, prohibit a user from using a single payment device to transact using multiple payment accounts.

Thus, there is a need for a technical solution to enable a payment device to conduct financial transactions using multiple payment accounts.

SUMMARY

The present disclosure provides a description of systems and methods for the transmitting of details for multiple payment accounts for use by a payment device.

A method for transmitting multiple payment accounts for use by a payment device includes: allocating a cryptographic personal account number (CPAN) and producing at least one cryptographic master key set relating to this CPAN, transmitting, by a transmitting device, at least one such cryptographic master key set for storage in a payment device, receiving, by a receiving device, at least one device personal account number (DPAN), wherein each of the at least one DPAN is associated with a payment account associated with a consumer; generating, by a processing device, a repersonalization script for each of the at least one DPAN, wherein the repersonalization script includes a set of data associated with the corresponding DPAN; and transmitting, by the transmitting device, at least one repersonalization script to the payment device, wherein the payment device is configured to use the key set relating to the CPAN only for selected cryptographic calculations (and thus processing of these data items is be done by the CPAN issuer), and use the DPAN and the associated set of data for all other aspects of a financial transaction.

A system for transmitting multiple payment accounts for use by a payment device includes a transmitting device, a receiving device, and a processing device. The processing device is configured to allocate a cryptographic personal account number (CPAN) and produce at least one cryptographic master key set relating to this CPAN. The transmitting device is configured to transmit at least one such cryptographic master key set for storage in a payment device. The receiving device is configured to receive at least one device personal account number (DPAN), wherein each of the at least one DPAN is associated with a payment account associated with a consumer. The processing device is further configured to generate a repersonalization script for each of the at least one DPAN, wherein the repersonalization script includes a set of data associated with the corresponding DPAN. The transmitting device is further configured to transmit at least one repersonalization script to the payment device. The payment device is configured to use the CPAN for selected cryptographic calculations (and thus processing of these data items is be done by the CPAN issuer), and use the DPAN and the associated set of data for all other aspects of a financial transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

System for Processing Financial Transactions Conducting with a Payment Device

Figure 1:
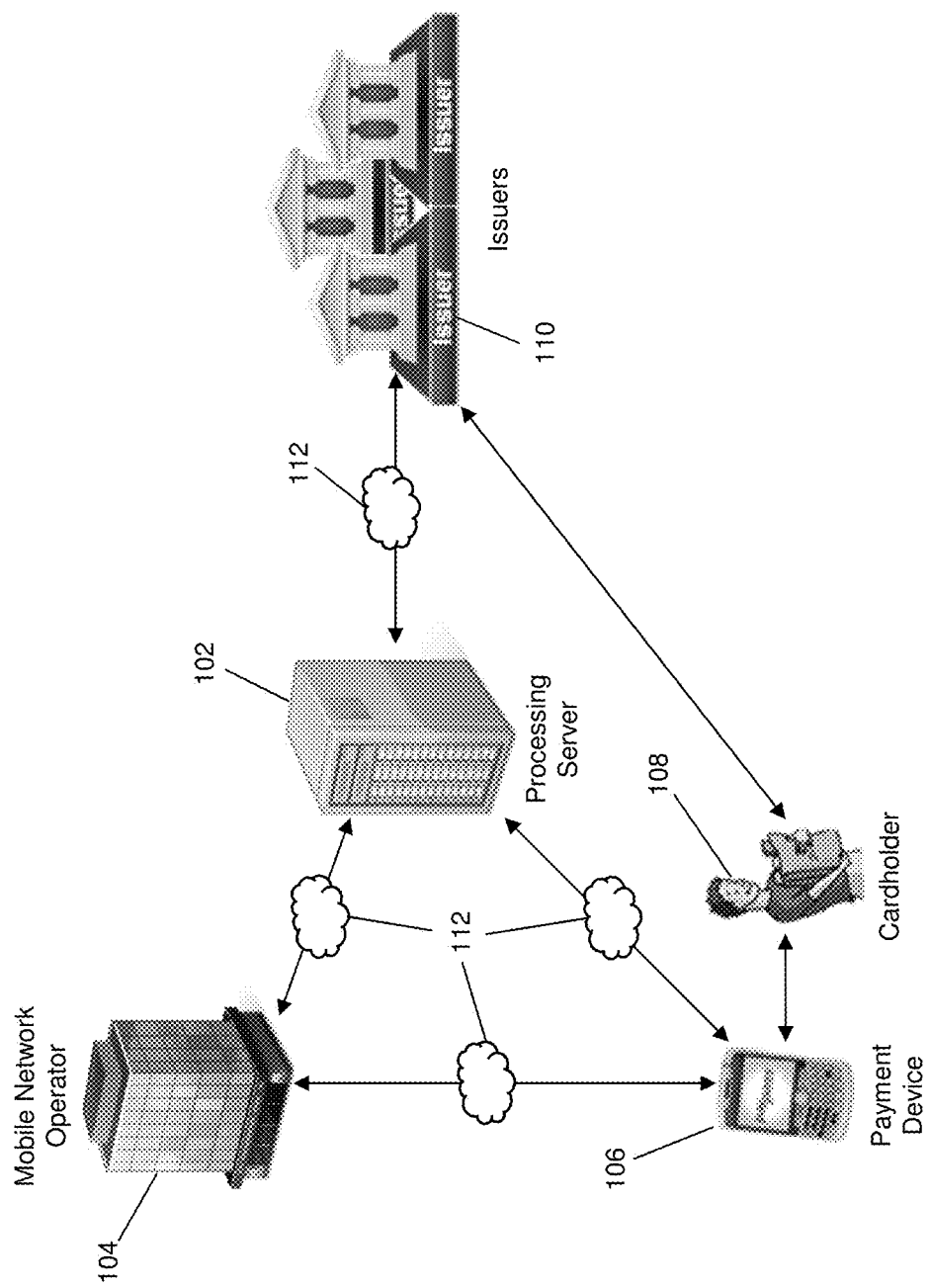
FIG. 1 is a high level architecture illustrating a system for the transmitting of repersonalization scripts to a payment device to enable transacting via multiple payment accounts in accordance with exemplary embodiments.

FIG. 1 illustrates a system 100 for transmitting of repersonalization scripts to a payment device to enable transacting via multiple payment accounts.

The system 100 may include a processing server 102. The processing server 102, discussed in more detail below, may store a plurality of master cryptographic personal account numbers (CPANs). Each CPAN may be unique value associated with a single payment device, such as a payment device 106. The processing server 102 may generate a cryptographic master key set corresponding to each CPAN. The CPANs and corresponding cryptographic master key sets may be stored in a key database, which may be included as part of the processing server 102 or stored externally to the processing server 102.

The processing server 102 may transmit at least one generated cryptographic master key set to the payment device 106 for storage in the payment device 106. The cryptographic master key set may be transmitted via a network 112, such as a mobile communication network. In some embodiments, the at least one generated cryptographic master key set may be transmitted to a mobile network operator 104, which may store the cryptographic master key set in a secure storage of the payment device 106 as part of the manufacture and/or distribution of the payment device 106, prior to the provisioning of the payment device 106 to an end user. Types of secure storage suitable for the storage of the cryptographic master key set will be apparent to persons having skill in the relevant art and may include an embedded chip, a secure element, etc.

The payment device 106 may be provisioned (e.g., by the mobile network operator 104) to a cardholder 108. The cardholder 108 may be a consumer associated with one or more payment accounts operated by one or more issuers 110, such as issuing banks. The issuers 110 operating payment accounts associated with the cardholder 108 may transmit, via the network 112, device personal account number (DPANs) associated with the payment accounts to the processing server 102. The processing server 102 may receive the DPANs, which may be stored in a database.

The processing server 102 may then generate a repersonalization script for each of the DPANs received from the issuers 110, each repersonalization script including the DPAN and a set of data associated with the DPAN, such as a routing number, expiration date, security code, certificates or any other suitable data for use in the funding and/or processing of a financial transaction as will be apparent to persons having skill in the relevant art. In some embodiments, the set of associated data may include data based on account type (e.g., payment card, checking account, virtual account, etc.) of the payment account associated with the DPAN.

The processing server 102 may transmit at least one generated repersonalization script to the payment device 106. The cardholder 108 may then transact at a merchant using the payment device 106. The payment device 106 may include a software application, which may be configured to execute the repersonalization script. The execution of the repersonalization script may cause the payment device to exchange data stored in the secure storage for any existing payment account with the DPAN and associated set of data included in the repersonalization script. The payment device 106 may then be configured to transact via the associated payment account.

The payment device 106 may be configured to transmit payment details and other data to a merchant (e.g., via a point-of-sale terminal) using systems and methods that will be apparent to persons having skill in the art. Data that may be included in the payment details will additionally be apparent to persons having skill in the relevant art. The payment device 106 may be configured to use the cryptographic master key set associated with the CPAN to perform selected cryptographic calculations relating to data items typically exchanged between the payment device 106 and the issuer 110 (and thus processing of these data items must be done by the CPAN issuer), and use the DPAN and the associated set of data for other aspects of a financial transaction.

Processing Device

Figure 2:
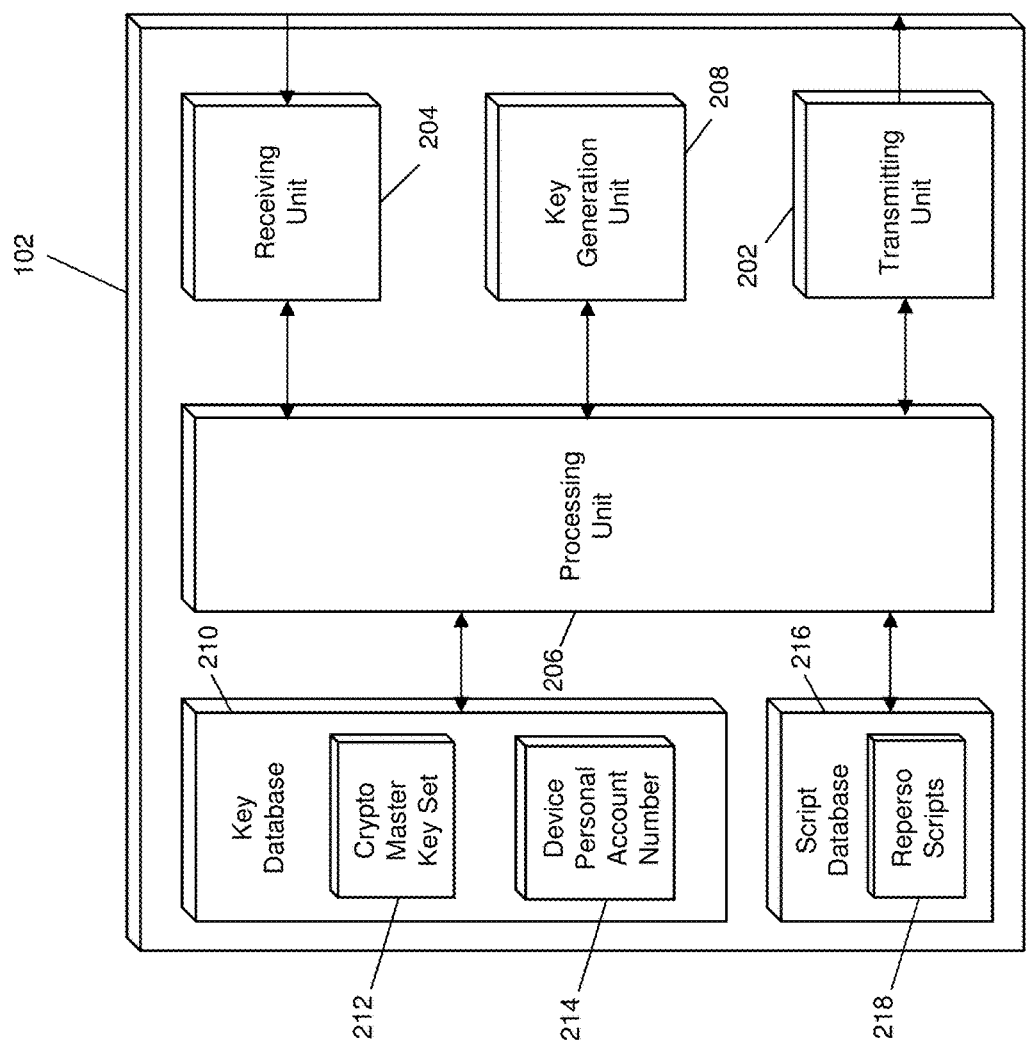
FIG. 2 is a block diagram illustrating the processing server of FIG. 1 for the creation and transmission of repersonalization scripts and associated data in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a transmitting unit 202. The transmitting unit 202 may be configured to transmit at least one cryptographic master key set 212, corresponding to a CPAN, to the payment device 106 and/or the mobile network operator 104. In some embodiments, the cryptographic master key set 212 corresponding to the CPAN may be generated and/or identified by a processing unit 206. The processing unit 206 may store the identified/generated cryptographic master key set 212 in a key database 210. In some instances, the processing unit 206 may store information in the key database 210 associating the cryptographic master key set 212 with the corresponding payment device 106. Data suitable for associating the cryptographic master key set 212 with the corresponding payment device 106 will be apparent to persons having skill in the relevant art and may include, for example, a phone number, IMEI or media access control (MAC) address associated with the payment device 106.

The processing server 102 may also include a receiving unit 204. The receiving unit 204 may be configured to receive the DPANs 214 from the issuers 110, such as via the network 112. Each of the received DPANs 214 may be associated with a payment account associated with a consumer, such as the cardholder 108 associated with the payment device 106 to which the cryptographic master key set was transmitted. The processing unit 206 may store the received DPANs 214 in the key database 210. In some embodiments, the DPANs 214 may be associated with a cryptographic master key set 212, such that each DPAN 214 associated with the cardholder 108 may be associated with the cryptographic master key set 212 transmitted to the payment device 106 associated with the cardholder 108.

The processing unit 206 may be further configured to generate a repersonalization script 218 including at least the DPAN 214 and a set of data associated with the DPAN 214. The data associated with the DPAN 214 may be provided by the issuers 110 along with the DPAN 214, or may be separately identified and/or generated by the processing unit 206 or received by the receiving unit 204. In some embodiments, the processing unit 206 may store the generated repersonalization scripts 218 in a script database 216. In a further embodiment, the script database 216 may be included as part of the key database 210. In an even further embodiment, the repersonalization scripts may be stored in the key database 210 as associated with the corresponding DPANs 214.

The transmitting unit 202 may be further configured to transmit the generated repersonalization script or scripts 218 to the payment device 106. In some embodiments, the transmission of a repersonalization script 218 to the payment device 106 may be performed in response to the receipt of a request for the repersonalization script 218 received by the receiving unit 204. For example, the cardholder 108 may request a repersonalization script 218 to enable the payment device 106 to conduct a financial transaction with a new payment account, such as via a software application configured to execute repersonalization scripts. The receiving unit 204 may receive the request, and the corresponding repersonalization script 218 transmitted to the payment device from where the request originated. In some instances, the request may be submitted via one computing device (e.g., a computer) and the corresponding repersonalization script 218 transmitted to a different payment device (e.g., a smart phone).

In one embodiment, the receiving unit 204 may receive the request for a repersonalization script from the payment device 106 and/or the cardholder 108 prior to the receipt of a DPAN 214. In such an embodiment, the request may include identifying information to indicate the payment account with which the cardholder 108 wishes to transact. The transmitting unit 202 may then transmit a request for the DPAN 214 and associated set of data associated with the payment account to the corresponding issuer 110. The issuer 110 may then return the DPAN 214 and associated data, which the processing unit 206 may use to then generate the repersonalization script 218.

In some embodiments, the processing server 102 may include a key generation unit 208. The key generation unit 208 may be configured to generate cryptographic master key sets 212 corresponding to CPANs. Methods for generating key sets based on account numbers will be apparent to persons having skill in the relevant art. In some embodiments, the key generation unit 208 may be further configured to first generate the master CPAN, and then generate the corresponding cryptographic master key set 212.

Method for Generating, Transmitting, and Executing Repersonalization Scripts

Figure 3:
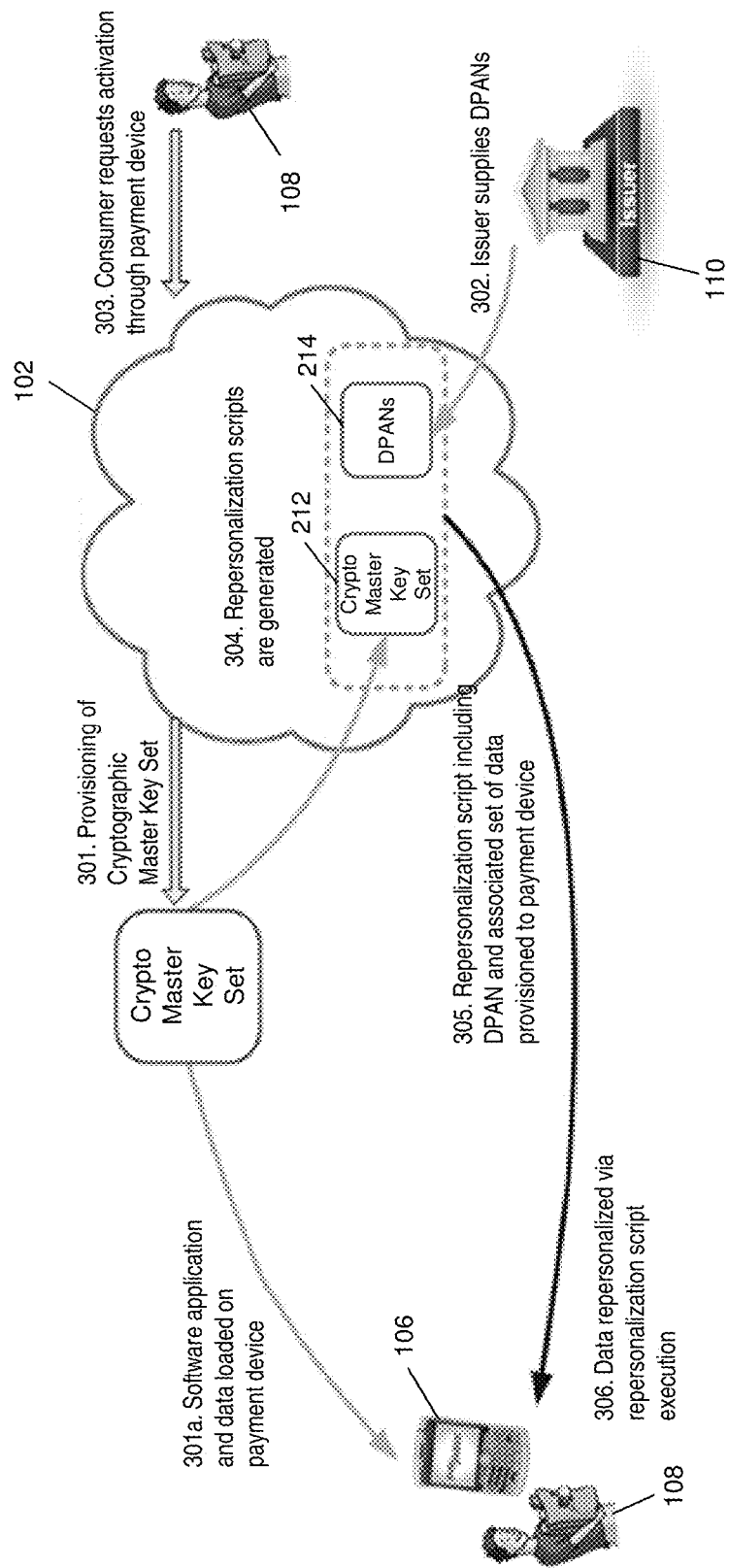
FIG. 3 is a flow diagram illustrating a method for the generation of repersonalization scripts and transmission thereof to a payment device in accordance with exemplary embodiments.

FIG. 3 is a flow diagram illustrating a high level method for the generation, transmission, and execution of repersonalization scripts. In step 301, the processing server 102 may provision the cryptographic master key set 212 to the payment device 106. In some instances, the cryptographic master key set 212 may be provided to the mobile network operator 104, which may include the cryptographic master key set 212 in a secure storage of the payment device 106 prior to distribution of the payment device 106. In some embodiments, the CPAN corresponding to the cryptographic master key set 212 may also be transmitted to the payment device 106. In a further embodiment, the CPAN may be stored in the secure storage of the payment device 106 as well.

In step 301a, a software application and corresponding data may be loaded on the payment device 106. The software application may be a software program configured to be executed by the payment device 106, and may be configured to execute repersonalization scripts and transmit payment information, such as a wallet program. Types of software applications suitable for performing the functions as disclosed herein, and methods for the loading and installation thereof to the payment device 106, will be apparent to persons having skill in the relevant art. It will be further apparent that, in some instances, the software application may be previously included on the payment device 106, such as installed on the payment device 106 by the mobile network operator 104.

In step 302, an issuer 110 may supply one or more DPANs 214 to the processing server 102, wherein each DPAN is associated with a payment account associated with the cardholder 108. In an exemplary embodiment, the cardholder 108 may be associated with the payment device 106. In step 303, the cardholder 108 may request activation of a payment account. In some instances, the request may be submitted to the processing server 102 via the payment device 106. In other instances, the request may be submitted to the processing server 102 via a separate computing device. In such an instance, the request may identify the payment device 106 to which the repersonalization script is to be transmitted, or may identify the cardholder 108, which may enable the processing server 102 to identify the payment device 106 associated with the cardholder 108. It will be apparent to persons having skill in the relevant art that step 303 may be performed prior to step 302, or may be an optional step (e.g., such that repersonalization scripts are automatically generated and transmitted to the payment device 106 without being requested by the cardholder 108).

In step 304, the processing server 102 may generate a repersonalization script 218 including the DPAN 214 and associated set of data associated with the payment account indicated in the request received from the cardholder 108. Then, in step 305, the processing server 102 may transmit the generated repersonalization script 218 to the payment device 106. In step 306, the payment device 106 may execute (e.g., via the software application) the repersonalization script 218. The execution of the repersonalization script 218 may cause the payment device 106 to exchange an existing DPAN and associated set of data in a secure storage (e.g., a secure element) with the DPAN and associated set of data included in the repersonalization script 218.

Figure 4:
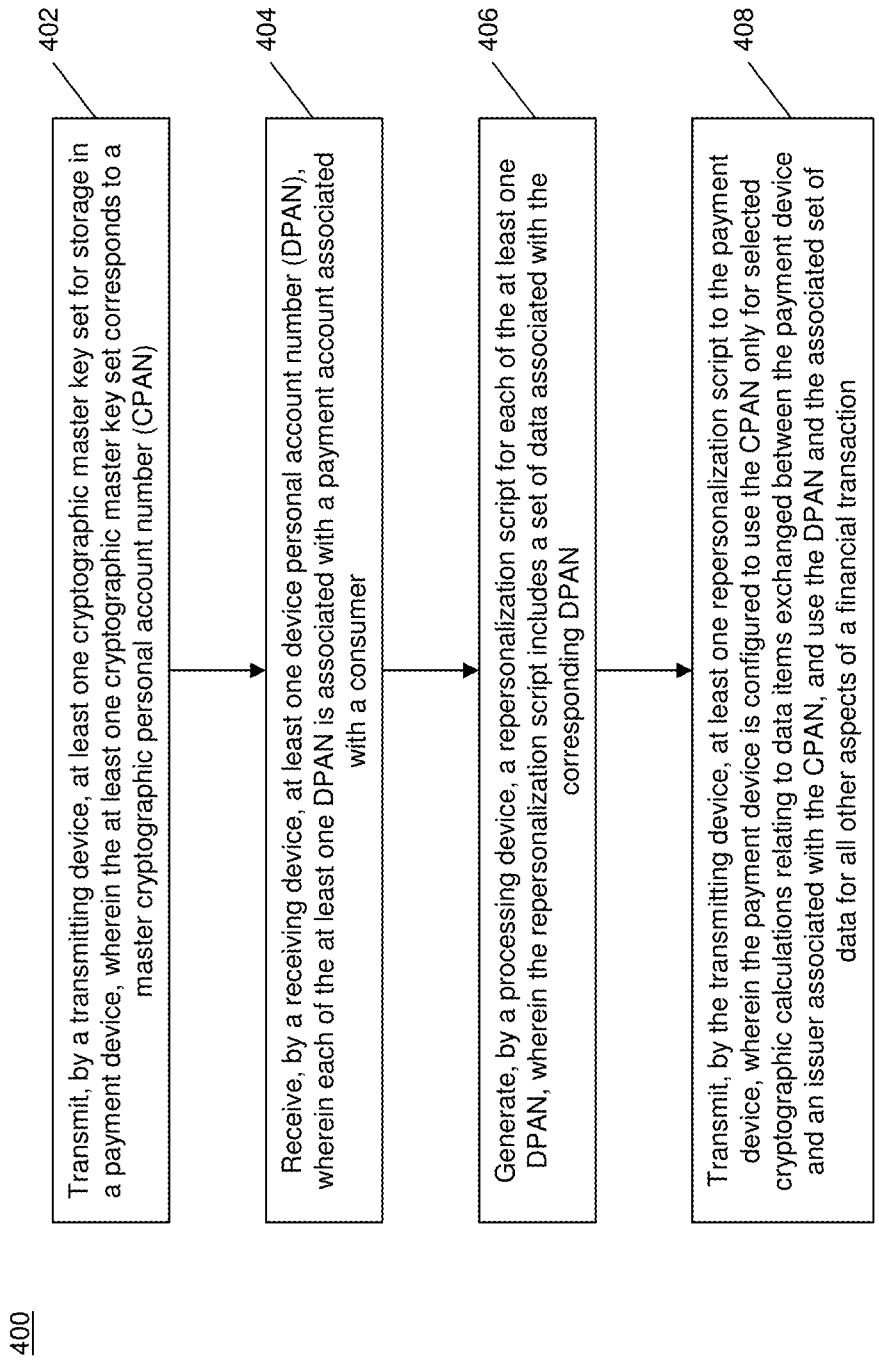
FIG. 4 is a flow chart illustrating an exemplary method for transmitting multiple payment accounts for use by a payment device in accordance with exemplary embodiments.

The payment device 106 may then be configured to conduct a financial transaction to be funded by the payment account associated with the DPAN. In some instances, the payment device 106 may store the repersonalization script 218 in the secure storage of the payment device 106 such that it may not be accessed or modified. In such an instance, the repersonalization script 218 may be utilized multiple times, such as for the cardholder 108 to switch back and forth between multiple payment accounts. Methods for receiving a repersonalization script 218 via a network (e.g., the network 112) and storing the script in secure storage in the payment device 106 will be apparent to persons having skill in the relevant art. In another instance, the repersonalization script 218 may be stored in insecure storage (such as in the insecure memory of the payment device 106) but be protected in such a way that it cannot be used if it is modified, and thus can be utilized multiple times, such as for the cardholder 108 to switch back and forth between multiple accounts. Methods for protecting the scripts from such modification will be apparent to persons having skill in the relevant art Exemplary Method for Transmitting Multiple Payment Accounts to a Payment Device FIG. 4 illustrates an exemplary method 400 for the transmitting of multiple payment accounts for use by a payment device via repersonalization scripts.

In step 402, at least one cryptographic master key set (e.g., the cryptographic master key set 212) may be transmitted, by a transmitting device (e.g., the transmitting unit 202) for storage in a payment device (e.g., the payment device 106), wherein the at least one cryptographic master key set 212 corresponds to a master cryptographic personal account number (CPAN). In one embodiment, the payment device 106 may be configured to store the CPAN upon receipt and storage of the cryptographic master key set 212. In some embodiments, the cryptographic master key set 212 may be transmitted for storage in the payment device prior to a provisioning of the payment device 106 to a consumer.

In step 404, at least one device personal account number (DPAN) and associated data may be received by a receiving device (e.g., the receiving unit 204), wherein each of the at least one DPAN (e.g., the DPAN 214) is associated with a payment account associated with a consumer (e.g., the cardholder 108). In one embodiment, the payment device 106 may be associated with the consumer 108.

In step 406, a repersonalization script (e.g., the repersonalization script 218) may be generated, by a processing device (e.g., the processing unit 206), for each of the at least one DPAN 214, wherein the repersonalization script 118 includes a set of data associated with the corresponding DPAN 214. In one embodiment, the repersonalization script 218 may be configured to cause the payment device 106 to replace an existing DPAN and associated set of data in a secure storage with the DPAN 214 and associated set of data included in the repersonalization script 218.

In step 408, at least one repersonalization script 218 may be transmitted, by the transmitting device 202, to the payment device 106, wherein the payment device 106 is configured to use the CPAN for selected cryptographic (and thus processing of these data items is be done instead by the CPAN issuer), and use the DPAN and the associated set of data for all other aspects of a financial transaction. In one embodiment, the CPAN may be provided as additional data as part of the financial transaction. In some embodiments, the payment device 106 may be further configured to store the repersonalization script 218 for multiple uses.

In one embodiment, the payment device 106 may be further configured to store the repersonalization script 218 in a storage other than a secure storage. In a further embodiment, the payment device 106 may be configured to transmit the repersonalization script 218 to the secure storage prior to execution of the script by the payment device 106. In an even further embodiment, the repersonalization script 218 may be transmitted to the secure storage in response to an instruction received by a user. In another further embodiment, the user may be the consumer 108 associated with the payment account associated with the DPAN 214 included in the repersonalization script 218.

In some embodiments, the repersonalization script 218 may be configured such that it may not be modified by the payment device 106. In a further embodiment, the payment device 106 may be configured to detect any attempted modification of the repersonalization script 218. In one embodiment, the repersonalization script 218 may be configured to be executed by a software application stored in and executed by the payment device 106. In a further embodiment, the method 400 may further include transmitting, by the transmitting device 202, the software application to the payment device 106.

Computer System Architecture

Figure 5:
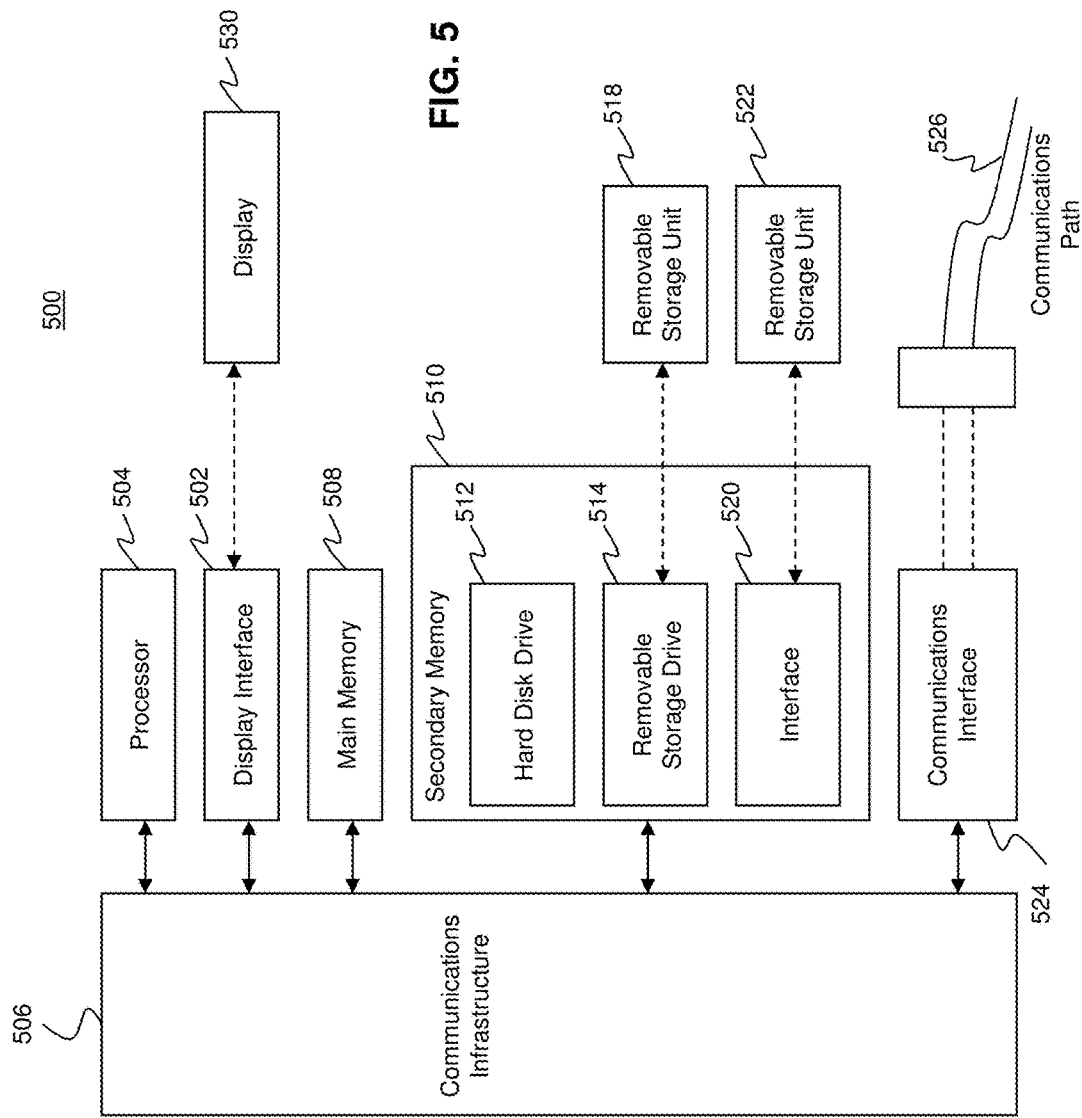
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the mobile device 102, processing server 116, issuer 104, merchant 112, acquirer 114, and mobile network operator 110 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4A, 4B, 6, and 7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. The processor device 504 may be connected to a communication infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive, the removable storage unit 518 may be a floppy disk. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

Computer program medium and computer usable medium may refer to memories, such as the main memory 508 and secondary memory 510, which may be memory semiconductors (e.g. DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the method illustrated by FIG. 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

Techniques consistent with the present disclosure provide, among other features, a system and method for transmitting multiple payment accounts for use by a payment device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for transmitting multiple payment accounts for use by a payment device, comprising:

allocating, by a processing device of a processing server, a cryptographic personal account number (CPAN), from a plurality of stored CPANs, and producing at least one cryptographic master key set corresponding to the CPAN;

transmitting, by a transmitting device of the processing server, the at least one produced cryptographic master key set corresponding to the CPAN for storage in a payment device;

receiving, by a receiving device of the processing server, at least one device personal account number (DPAN) from a card issuer, wherein the at least one DPAN is associated with a payment account associated of a consumer;

generating, by the processing device of the processing server, a repersonalization script for the at least one DPAN, wherein the generated repersonalization script includes at least (i) the DPAN and (ii) a set of data received from the card issuer and associated with the DPAN; and transmitting, by the transmitting device of the processing server, the at least one generated repersonalization script to the payment device for execution, wherein execution of the repersonalization script causes the payment device to exchange data, for any existing payment account, stored in the payment device with the DPAN and associated set of data included in the repersonalization script, perform, using the CPAN, selected cryptographic calculations relating to data items exchanged between the payment device and the card issuer associated with the CPAN, and perform, using the DPAN and the associated set of data, all other aspects of a financial transaction.

2. The method of claim 1, wherein the repersonalization script is configured to cause the payment device to replace an existing DPAN and associated set of data in a secure storage with the DPAN and associated set of data included in the repersonalization script.

3. The method of claim 2, wherein the payment device is further configured to store the repersonalization script for multiple uses.

4. The method of claim 2, wherein the payment device is configured to store the repersonalization script in storage other than the secure storage.

5. The method of claim 4, wherein the payment device is configured to transmit the repersonalization script to the secure storage prior to execution by the payment device.

6. The method of claim 5, wherein the repersonalization script is transmitted to the secure storage in response to an instruction received by a user.

7. The method of claim 6, wherein the user is the consumer associated with the payment account associated with the DPAN included in the repersonalization script.

8. The method of claim 1, wherein the repersonalization script is protected from modification and any such modification can be detected by the payment device.

9. The method of claim 8, wherein the repersonalization script is protected from unintended disclosure of its content by encrypting the script in such a way as only the payment device can decrypt and subsequently use the script.

10. The method of claim 1, wherein the payment device is configured to store the CPAN at the same time as receipt and storage of the master cryptographic key set.

11. The method of claim 10, wherein the payment device is further configured to provide the CPAN as additional data as part of the financial transaction.

12. The method of claim 1, wherein the at least one cryptographic master key set is transmitted for storage in the payment device prior to a provisioning of the payment device to the consumer.

13. The method of claim 1, wherein the payment device is associated with the consumer.

14. The method of claim 1, wherein each repersonalization script is configured to be executed by a software application stored in and executed by the payment device.

15. The method of claim 14, further comprising:
transmitting, by the transmitting device of the processing server, to the payment device, the software application.

16. The system of claim 1, wherein the transmitting device, of the processing server, is further configured to transmit, to the payment device, the software application.

17. An electronic system for transmitting multiple payment accounts for use by a payment device, comprising:
a processing device, of a processing server, configured to allocate cryptographic personal account number (CPAN), from a plurality of stored CPANs, and produce at least one cryptographic master key set corresponding to the CPAN;
a transmitting device, of the processing server, configured to transmit the at least one produced cryptographic master key corresponding to the CPAN set for storage in a payment device; and
a receiving device, of the processing server, configured to receive at least one device personal account number (DPAN) from a card issuer, wherein the at least one DPAN is associated with a payment account of a consumer;
wherein the processing device, of the processing server, is further configured to generate a repersonalization script for the at least one DPAN, wherein the generated repersonalization script includes at least (i) the DPAN and (ii) a set of data received from the card issuer and associated with the DPAN,
wherein the transmission device, of the processing server, is further configured to transmit the at least one generated repersonalization script to the payment device for execution, and
wherein execution of the repersonalization script causes the payment device to
exchange data, for any existing payment account, stored in the payment device with the DPAN and associated set of data included in the repersonalization script, perform, using the CPAN, selected cryptographic calculations relating to data items exchanged between the payment device and the card issuer associated with the CPAN, and perform, using the DPAN and the associated set of data, all other aspects of a financial transaction.

18. The system of claim 17, wherein the repersonalization script is configured to cause the payment device to replace an existing DPAN and associated set of data in a secure storage with the DPAN and associated set of data included in the repersonalization script.

19. The system of claim 18, wherein the payment device is further configured to store the repersonalization script for multiple uses.

20. The system of claim 18, wherein the payment device is configured to store the repersonalization script in storage other than the secure storage.

21. The system of claim 20, wherein the payment device is configured to transmit the repersonalization script to the secure storage prior to execution by the payment device.

22. The system of claim 21, wherein the repersonalization script is transmitted to the secure storage in response to an instruction received by a user.

23. The system of claim 22, wherein the user is the consumer associated with the payment account associated with the DPAN included in the repersonalization script.

24. The system of claim 17, wherein the repersonalization script is protected from modification and any such modification can be detected by the payment device.

25. The system of claim 24, wherein the repersonalization script is protected from unintended disclosure of its content by encrypting the script in such a way as only the payment device can decrypt and subsequently use the script.

26. The system of claim 25, wherein the payment device is further configured to provide the CPAN as additional data as part of the financial transaction.

27. The system of claim 17, wherein the payment device is configured to store the CPAN at the same time as receipt and storage of the master cryptographic key set.

28. The system of claim 17, wherein the at least one cryptographic master key set is transmitted for storage in the payment device prior to a provisioning of the payment device to the consumer.

29. The system of claim 17, wherein the payment device is associated with the consumer.

30. The system of claim 17, wherein each repersonalization script is configured to be executed by a software application stored in and executed by the payment device.

\* \* \* \* \*